(12) United States Patent
Hung et al.

(10) Patent No.: US 8,139,666 B2
(45) Date of Patent: Mar. 20, 2012

(54) CHANNEL ESTIMATION TECHNIQUE FOR MULTI-CARRIER SYSTEM

(75) Inventors: Kun-Chien Hung, Pingtung County (TW); David W. Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 281 days.

(21) Appl. No.: 12/576,866

(22) Filed: Oct. 9, 2009

(65) Prior Publication Data

US 2010/0260248 A1  Oct. 14, 2010

(30) Foreign Application Priority Data

Apr. 13, 2009 (TW) ................... 98112240 A

(51) Int. Cl.
*H04K 1/10* (2006.01)
*H04L 27/28* (2006.01)

(52) U.S. Cl. ........ 375/260; 375/267; 375/350; 370/203; 370/208

(58) Field of Classification Search .................. 375/260, 375/267, 324, 340, 343, 346–350; 370/203–211
See application file for complete search history.

(56) References Cited

U.S. PATENT DOCUMENTS

| | | | |
|---|---|---|---|
| 2005/0105647 A1 | 5/2005 | Wilhelmsson et al. | |
| 2006/0159203 A1 | 7/2006 | Poloni et al. | |
| 2007/0110172 A1 | 5/2007 | Faulkner et al. | |
| 2007/0211827 A1* | 9/2007 | Baggen et al. | 375/316 |
| 2007/0291637 A1 | 12/2007 | Saitou | |
| 2008/0008258 A1 | 1/2008 | Tanabe | |
| 2008/0049598 A1 | 2/2008 | Ma et al. | |
| 2008/0084817 A1 | 4/2008 | Beckman et al. | |
| 2008/0137788 A1 | 6/2008 | Bang et al. | |
| 2008/0144730 A1 | 6/2008 | Akella et al. | |

OTHER PUBLICATIONS

Witrisal, "On estimating the RMS delay spread from the frequency-domain level crossing rate," IEEE Commun. Lett., vol. 5, No. 7, pp. 287-289, Jul. 2001.

Witrisal et al., "A new method to measure parameters of frequency-selective radio channels using power measurements," IEEE Trans. Commun., vol. 49, No. 10, pp. 1788-1800, Oct. 2001.

Athaudage et al., "Delay-spread estimation using cyclic-prefix in wireless OFDM systems," IEE Proc.-Commun., vol. 151, No. 6, pp. 559-566, Dec. 2004.

(Continued)

*Primary Examiner* — Curtis Odom
(74) *Attorney, Agent, or Firm* — Rosenberg, Klein & Lee

(57) ABSTRACT

The present invention relates to a channel estimation technique for multi-carrier system which uses pilot signal to first obtain pilot subcarrier channel responses, then estimate the mean delay and the root-mean-square delay spread of the channel, and then uses interpolation to obtain the channel responses of arbitrary subcarriers. The present invention is able to perform channel estimation and to accurately estimate various channel delay parameters (such as the initial delay, the mean delay, and the root-mean-square delay spread) with very low quantity of pilot signal and with low computational complexity. In addition, the present invention has broad applicability, as it does not require the channel power-delay profile to be of certain specific types and it can operate in systems where pilot subcarriers have an irregular configuration.

20 Claims, 8 Drawing Sheets

OTHER PUBLICATIONS

Yucek et al., "Time dispersion and delay spread estimation for adaptive OFDM systems," IEEE Trans. Veh. Technol., vol. 57, No. 3, pp. 1715-1722, May 2008.

Hung et al., "Digital Signal Processing Algorithms for Communication Receivers: Synchronization, Equalization and Channel Estimation" oral defense, Hsinchu, Taiwan, R.O.C, Oct. 13, 2008.

Erceg et al., "Channel Models for Fixed Wireless Applications" P17, IEEE 802.16 Broadband Wireless Access Working Group, Jul. 16, 2001.

Sorensen et al., "Extension of the ITU channel models for wideband (OFDM) systems" P5, Table 1, May 2005.

* cited by examiner

CHANNEL ESTIMATION TECHNIQUE FOR MULTI-CARRIER SYSTEM

BACKGROUND OF THE INVENTION

1. Field of the Invention

The present invention relates to a channel estimation technique for wireless communications, particularly to a channel estimation technique for multi-carrier system that utilizes orthogonal frequency division multiplexing (OFDM) modulation scheme.

2. Description of the Prior Art

Wireless communication systems convert data into signals that are transmitted without wired links to guide their propagation. The signals are thus subject to multipath propagation arising from diffraction, scattering, and reflection, in addition to loss of energy. Moreover, the signal attenuation varies with time and distance, resulting in a phenomenon known as fading. Since the signal receiver must be able to recover the original data from the received signal, a communication system must have hold of the characteristics of the transmission channel's response, so that various information processing techniques can be used to compensate the signal loss in wireless channel transmission.

Due to its higher wireless bandwidth efficiency and noise tolerance, orthogonal frequency division multiplexing (OFDM), among all methods, has been adopted in many communication standards, including 802.11a/g WLAN, WiMAX, digital audio broadcasting (DAB) and digital video broadcasting (DVB). In addition, OFDM system can utilize known pilot signals to estimate the channel responses at the pilot subcarriers and thence the channel responses at other subcarriers (especially the data subcarriers). The above-said channel estimation often makes use of interpolation and extrapolation techniques, but these two types of techniques have very similar mathematical structures and people skilled in the art can easily convert interpolation techniques for extrapolation use and vice versa. For convenience and clarity, the present invention uses the term "interpolation" to indicate both interpolation and extrapolation for the following discussions, which also accords with common usage of terms in this art.

As examples of OFDM channel response estimation, both US patent publications 2008/0049598 and 2008/0008258 employ linear minimum mean-square error (LMMSE) interpolation to estimate the data subcarrier channel responses, wherein the needed channel response correlation values are calculated from existing subcarrier channel response estimates (such as the estimates at the pilot subcarriers) via cross-multiplication and averaging. On the other hand, US patent publications 2008/0144730, 2008/0137788, 2005/0105647, 2007/0110172 and 2008/0084817 also employ LMMSE interpolation for channel response estimation, but they assume that the power-delay profile (PDP) of the channel has a certain form, such as exponential, uniform, or some other shape. They compute the parameters of the PDP with specific methods, from which the corresponding channel response correlation values can be obtained and thence the interpolator coefficients for channel response estimation can be calculated.

However, the first group of techniques mentioned above requires a sufficiently large number of pilot subcarrier channel response estimates, or else the calculated correlation values will contain significant noise. Yet the more the pilot subcarrier estimates, the greater the amount of computation required in the system. The second group of techniques requires the use of specific channel PDPs for channel estimation. For example, the US patent publication 2008/0144730 mentioned above utilizes a uniform PDP with a worst-case delay spread, but the technique for estimating the delay spread is not given. The US patent publication 2008/0137788 also uses a uniform PDP to estimate the channel delay spread, but neither is the estimation technique described. The US patent publication 2005/0105647 estimates the shape of the channel impulse response first and then decides to use the uniform or the exponential PDP. However, how to make the above decision based on the shape of the response is not stated. And there is no clear description of how to calculate the parameters for the two types of PDP. Furthermore, the method requires to estimate the channel impulse response. The US patent publication 2007/0110172 applies inverse fast Fourier transform (IFFT) to the pilot subcarrier channel response estimates to acquire the channel impulse response. Based on the channel impulse response, it then calculates the parameters of an exponential PDP. However, this technique requires specific pilot subcarrier configurations that are not compatible with the signal structures of some systems, such as WiMAX. Lastly, US patent publication 2008/0084817 also uses IFFT, through which it finds a number of points in the channel impulse response that have greater strengths and uses these points to construct the correlation function of the channel responses. Unfortunately, the modeling of the channel impulse response points that have greater strengths as having independent and identical distribution (i.i.d.) when constructing the correlation function is inappropriate.

In summary, the accuracy of channel estimation has direct impact on the performance of the communication system. Conventional LMMSE channel estimation methods either require a large quantity of pilot subcarrier channel response values or require the pilot subcarriers to have some regular configuration. As a result, conventional designs exhibit deficiencies and cannot satisfactorily address the needs of wireless uplink and downlink transmissions under fast motion. The present invention teaches a novel channel estimation technique that can effectively resolve the above problems of the conventional techniques.

SUMMARY OF THE INVENTION

The primary objective of the present invention is to provide a channel estimation technique for multi-carrier systems. The technique only needs a low quantity of pilot signal to perform channel response estimation, which not only reduces greatly the computational complexity of channel estimation, but also effects a higher accuracy in channel response estimation.

Another objective of the present invention is to provide a channel estimation technique for multi-carrier systems which has broad applicability in the sense that it does not require the channel PDP to be of certain specific types and that it can operate under the condition where the pilot subcarriers have an irregular or pseudo-random configuration.

In order to realize the above objectives, the channel estimation technique of the present invention first uses known pilot signal in combination with the least-square (LS) or any other applicable technique to estimate the channel responses at pilot subcarriers. With these estimates, some PDP parameters are calculated. Finally, the present invention uses an interpolation method, such as the LMMSE method, to estimate the channel response at any subcarrier.

Below, some embodiments are described in detail in connection with the attached drawings to facilitate understanding of the objectives, technical contents, characteristics and accomplishments of the present invention.

DETAILED DESCRIPTION OF THE INVENTION

OFDM type of technology usually divides the subcarriers in the multi-carrier signal into useful subcarriers and null subcarriers, where the useful subcarriers are further divided into data subcarriers and pilot subcarriers, with the pilot subcarriers interspersed among the data subcarriers and carrying pilot signals. However, the allocation of pilot subcarriers can be different for different communication systems. The most common ways of pilot subcarrier allocation are quasi-periodic (including periodic) configuration and pseudo-random or irregular configuration.

For example, in an OFDM-based DVB system, each OFDM symbol delivered from a transmitter contains a set of pilot subcarriers wherein the neighboring subcarriers are spaced twelve subcarriers apart; these pilot subcarriers are deemed to have a periodic configuration. On the other hand, for the downlink (DL) and the uplink (UL) signals in the Mobile WiMAX system (which employs a kind of OFDM known as orthogonal frequency-division multiple access, abbreviated OFDMA), by the pseudo-random distribution of the "clusters" and "tiles" in the frequency domain, the pilot subcarriers are also pseudo-randomly distributed as a whole.

The following paragraphs will elaborate some embodiments of the present invention concerning the channel estimation technique for multi-carrier systems under different sorts of subcarrier distribution.

Figure 1:
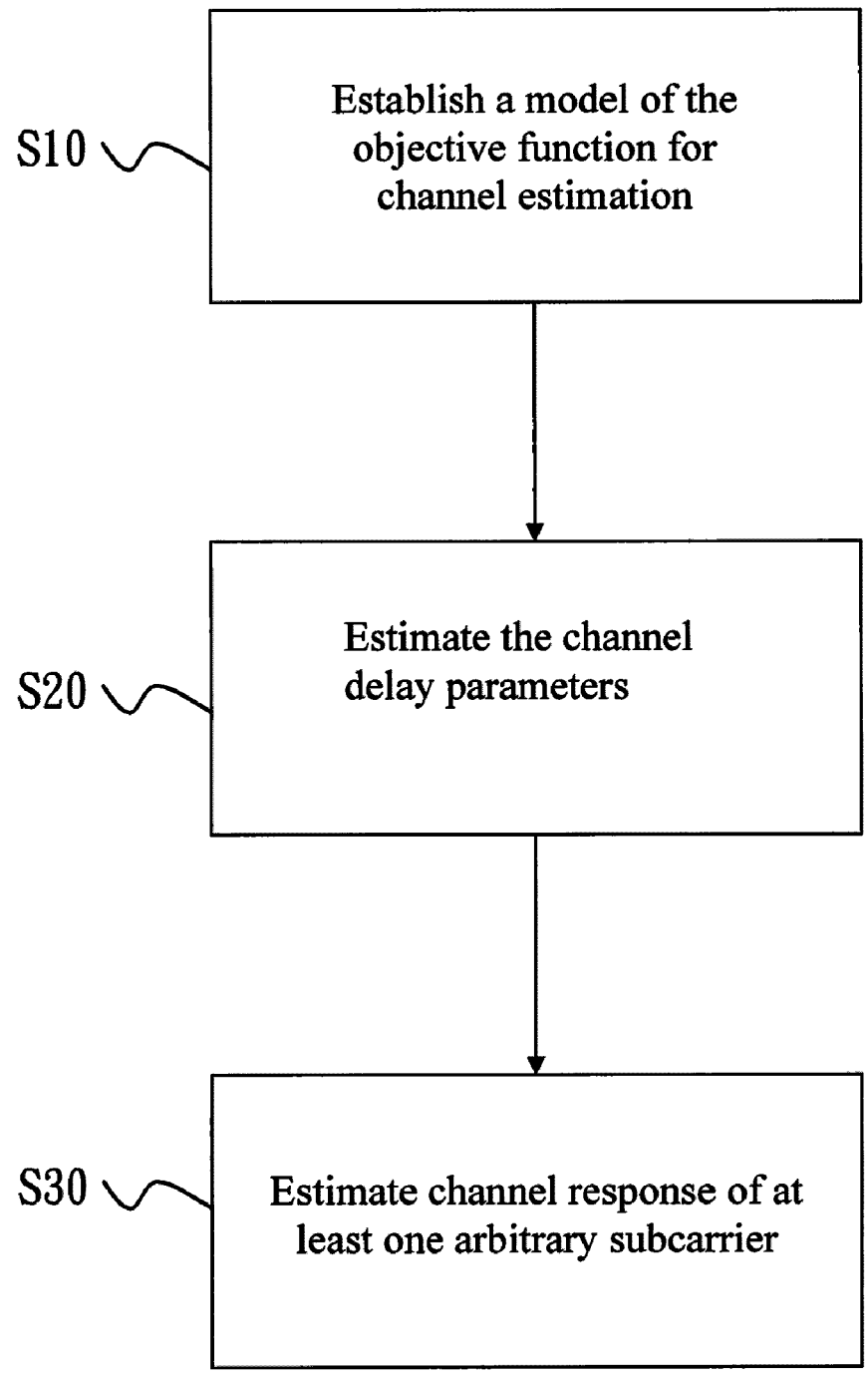
FIG. 1 is a flow chart schematically showing the channel estimation technique of the present invention.

FIG. 1 illustrates the flow of the channel estimation technique of the present invention where the technique comprises three main steps, namely, S10, S20 and S30. Step S10 establishes a model of the objective function for channel estimation, step S20 estimates the channel delay parameters, and step S30 estimates the channel response for at least one arbitrary subcarrier. Below, each step will be described in detail.

Figure 2:
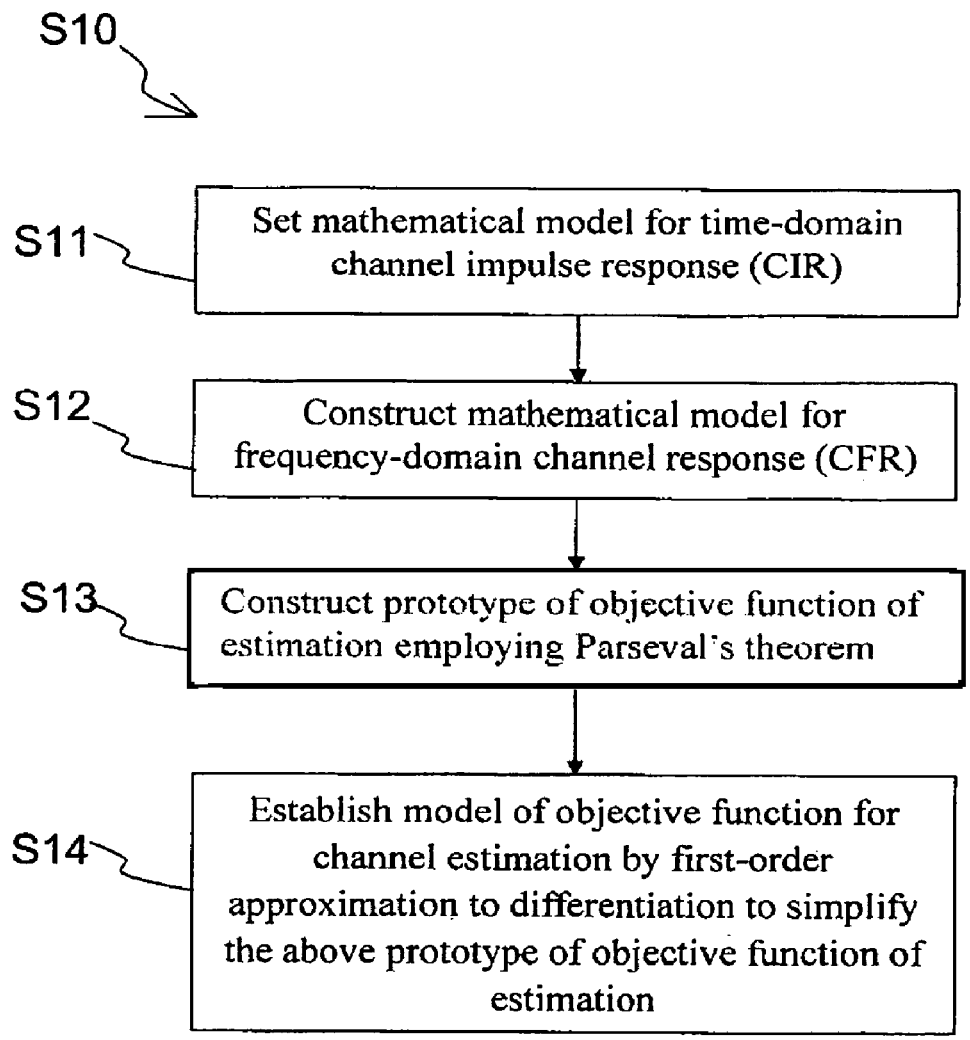
FIG. 2 is a flow chart schematically showing the procedure of establishing a model of objective function for channel estimation of the present invention.

First, refer to FIG. 2 which illustrates the procedure taken in step S10 of the present invention to establish the mathematical model of the objective function of estimation. The signals in an OFDM system can be considered in the time domain or in the frequency domain. As step S11 shows, the present invention first sets a mathematical model for the channel impulse response (CIR) in the time domain as follows:

$$h(n) = \sum_{l=0}^{L-1} \alpha_l \delta(n-l) \quad (1)$$

where h(n) denotes the CIR in the time domain, L denotes the length of the CIR (with L, n and l being integers in units of the sampling interval $T_S$) and $\alpha_l$ denotes the complex Gaussian gain of the l th path. Step S12 of the present invention applies discrete Fourier transform (DFT) to equation (1) to obtain a mathematical model for the channel frequency response (CFR) in the frequency domain as follows:

$$H(f) = \sum_{l=0}^{L-1} \alpha_l e^{-j2\pi l f/N} \quad (2)$$

where H(f) denotes the channel response in the frequency domain, N denotes the size of DFT used in the multi-carrier system, and the purpose of dividing by N in the exponent is to normalize the frequency f so as to make the period of H(f) in f equal to N. This completes the construction of the mathematical model of the frequency-domain channel response of step S12.

In step S13, first consider advancing the time-domain channel response by $\tau$ time units, i.e., by $\tau T_S$ in time, where $\tau$ can be of any value. Then fundamental signals and systems theory gives the corresponding frequency response $H_a(f)$ as:

$$H_a(f) = \sum_{l=0}^{L-1} \alpha_l e^{-j2\pi(l-\tau)f/N} \quad (3)$$

Define a function $J(\tau)$ with the following mathematical expression:

$$J(\tau) = E\left\langle \left| \frac{dH_a(f)}{df} \right|^2 \right\rangle = E\left\langle \left| \frac{d[e^{j2\pi\tau f/N}H(f)]}{df} \right|^2 \right\rangle \quad (4)$$

where E denotes expectation and $\langle \ \rangle$ denotes averaging in the frequency domain. According to Parseval's theorem, which states that the energy in a time-domain waveform is equal to the sum of energies in its Fourier components, $J(\tau)$ can be expressed equivalently as the following:

$$J(\tau) = \frac{4\pi^2}{N^2} \sum_{l=0}^{L-1} E(|\alpha_l|^2)(l-\tau)^2 \quad (5)$$

Via basic differential calculus, the value of $\tau$ that minimizes $\tilde{J}(\tau)$ can be obtained as shown in the following equation (where $\tau_\mu$ denotes the minimizing value of $\tau$):

$$\tau_\mu = \arg\min_\tau \tilde{J}(\tau) = \frac{\sum_{l=0}^{L-1} E(|\alpha_l|^2) l}{\sum_{l=0}^{L-1} E(|\alpha_l|^2)} \quad (6)$$

In equation (6), the mathematical expression to the right of the second equality sign is a conventional mathematical expression for the channel mean delay; in other words, the mean delay can be computed via differentiation of $\tilde{J}(\tau)$ Substituting the mean delay $\tau_\mu$ into the variable $\tau$ in the right-hand side (RHS) of equation (5) yields equation (7):

$$\min \tilde{J}(\tau) = \tilde{J}(\tau_\mu) = \frac{4\pi^2}{N^2} \sum_{l=0}^{L-1} E(|\alpha_l|^2)(l - \tau_\mu)^2 \quad (7)$$

Let $\tau_{rms}^2$ denote the conventional mean-square (MS) channel delay spread, i.e., $$\tau_{rms}^2 = \sum_{l=0}^{L-1} E(|\alpha_l|^2)(l - \tau_\mu)^2 \Big/ \sum_{l=0}^{L-1} E(|\alpha_l|^2).$$

Then from equation (7) we can obtain the following mathematical expression for the MS delay spread:

$$\tau_{rms}^2 = \frac{N^2 \min \tilde{J}(\tau)}{4\pi^2 \sum_{l=0}^{L-1} E(|\alpha_l^2|)} \quad (8)$$

Since the root-mean-square (RMS) delay spread of the channel is the square root of the MS delay spread, it can be denoted using $\tau_{rms}$. In other words, the RMS delay spread is equal to the square root of the minimum of $\tilde{J}(\tau)$ with respect to $\tau$ multiplied with $$N \Big/ \left(2\pi \sqrt{\sum_{l=0}^{L-1} E(|\alpha_l^2|)}\right),$$

where $$\sum_{l=0}^{L-1} E(|\alpha_l|^2)$$

represents the power gain of the channel.

From the above, we see that such channel parameters as the mean delay $\tau_\mu$, MS delay spread $\tau_{rms}^2$ and RMS delay spread $\tau_{rms}$ can all be calculated by differentiating $\tilde{J}(\tau)$. Hence in the following paragraphs, $\tilde{J}(\tau)$ will be termed the "protype of objective function of estimation." It has multiple equivalent mathematical expressions, including the middle and the RHS expressions of equation (4) and the RHS expression in equation (5). At this point, the work of step S13 on constructing the prototype of objective function is complete.

From the above, the mean delay $\tau_\mu$ and the MS delay spread $\tau_{rms}^2$ can be obtained by differentiating the RHS of equation (4) with respect to the variable $\tau$. However, the H(f) that appears in the RHS of equation (4) is the frequency response to be estimated. Moreover, the calculation of frequency-domain average represented by the notation $\langle\ \rangle$ requires, in principle, a large amount of frequency-domain data as well as takes a significant amount of computation. One advantage of the present invention is that it can use a small amount of preliminary channel response estimates, such as that easily estimated with the pilot signal, to perform channel response estimation. By doing so, the present invention is able to lower the computational complexity of the system. In this, take a plurality of subcarriers to be "modeling reference subcarriers," and let f and f+$F_S$ be the frequencies of two such subcarriers, where f and f+$F_S$ are also the indexes of these two subcarriers and $F_S$ is the frequency spacing between them. In addition, define a phase value $\phi = 2\pi\tau F_S/N$ and let the symbol $\ll\ \gg$ denote averaging over the modeling reference subcarriers (rather than averaging over all frequencies as indicated by $\langle\ \rangle$). In step S14, by approximating differentiation using first-order differencing, equation (4) can be rewritten into equation (9) as follows:

$$\tilde{J}(\tau) \approx E\left\{\left\langle\!\left\langle \frac{1}{F_S^2} |e^{j\phi} H(f + F_S) - H(f)|^2 \right\rangle\!\right\rangle\right\} \quad (9)$$

This equation is the desired model of objective function for channel estimation obtained at last in step S10.

The modeling reference subcarriers mentioned above can be pilot subcarriers, but they can also be other suitable subcarriers selected properly based on the communication system under consideration.

Figure 3:
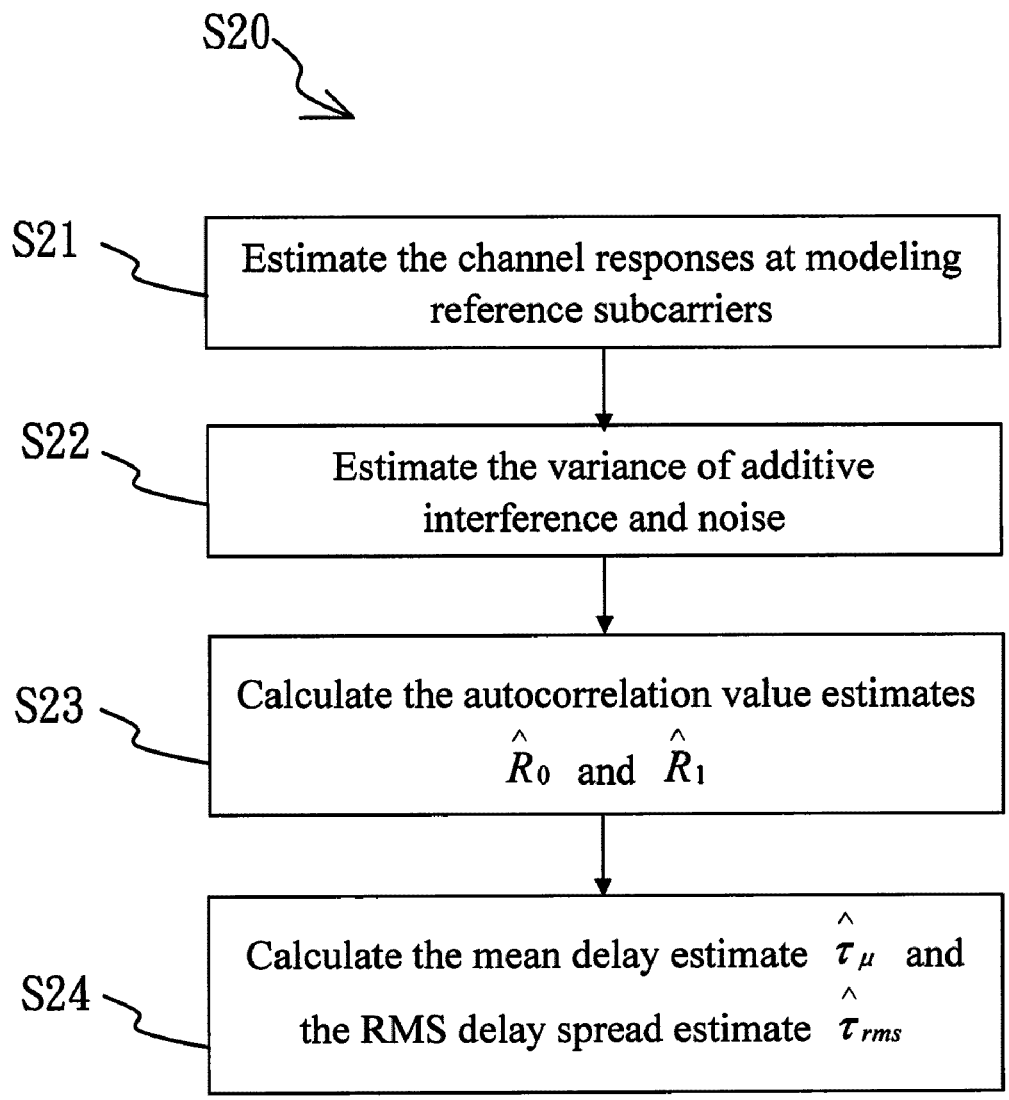
FIG. 3 is a flow chart schematically showing the method of estimating the channel delay parameters of the present invention.

Refer to FIG. 3. Step S21 estimates the channel responses at the modeling reference subcarriers. The purpose of S21 is to facilitate the later estimation of channel delay parameters performed via steps S23 and S24, where the estimated channel delay parameters include the mean delay and the RMS delay spread. In particular, if the modeling reference subcarriers consist solely of some pilot subcarriers, then the estimation of channel responses in step S21 may employ the least-square (LS) technique to obtain enough quantity of pilot subcarrier channel estimates, where the LS technique merely divides the signal value received at each selected pilot subcarrier position by the pilot signal value there. This division may be replaced by multiplication of the received signal value at each selected pilot subcarrier position by the reciprocal of the known signal value there or any equivalent computation. However, the embodiments described above are only to exemplify the present invention but not to limit the ways of estimating the modeling reference subcarrier channels of the present invention. People with reasonable skill in the art can employ different ways to perform modeling reference subcarrier channel estimation based on the spirit of the present invention. Therefore, any equivalent modification or variation according to the structures, characteristics and spirits disclosed in the present invention is to be also included within the scope of the present invention.

Next, note that in a practical environment the estimation of modeling reference subcarrier channel responses will be subject to the influence of background noise and interfering signals, resulting in inaccuracy in the estimates. Therefore in step S22, the present invention estimates the variance of the additive interference and noise. In OFDM transmission systems, this variance can usually be estimated using the average received power at the null subcarriers, such as those in the guard band or at other frequency positions. In the following, let $\hat{\sigma}_n^2$ an denote the estimated variance of interference and noise.

Next, to explain steps S23 and S24, first define the autocorrelation $R_i$ of the channel responses at the modeling reference subcarriers as in the following equation:

$$R_i = \langle\langle H(f+iF_S)H^*(f)\rangle\rangle \quad (10)$$

where i is an integer, f and f+iF$_S$ are two modeling reference subcarriers spaced iF$_S$ subcarriers apart in frequency, H( ) indicates the CFR, superscript * indicates taking the complex conjugate, and $\langle\langle\ \rangle\rangle$ denotes averaging over the modeling reference subcarriers. Substituting the autocorrelations $R_i$ into equation (9) yields equation (11) for the model of objective function for channel estimation:

$$\bar{J}(\tau) \approx \frac{2}{F_S^2}[E(R_0) - Re\{e^{j\phi}E(R_1)\}] \quad (11)$$

where $R_0$ is the autocorrelation value of modeling reference subcarrier channel responses at lag zero and $R_1$ is the autocorrelation value of modeling reference subcarrier channel responses at lag $F_S$.

Now consider step S23. Since the receiver does not have the original channel responses at the modeling reference subcarriers, but only their estimates through step S21, these estimated values are used to estimate the autocorrelation values. In this, let $\hat{H}(f)$ be the estimated CFR at frequency f. Use equation (12) below to estimate $R_0$ and equation (13) below to estimate $R_1$, where the estimated autocorrelation values are denoted $\hat{R}_0$ and $\hat{R}_1$, respectively:

$$\hat{R}_0 = \langle\langle |\hat{H}(f)|^2 \rangle\rangle - \hat{\sigma}_n^2 \quad (12)$$

$$\hat{R}_1 = \langle\langle \hat{H}(f+F_S)\hat{H}^*(f)\rangle\rangle \quad (13)$$

Next, consider step S24. The model of objective function for channel estimation given in equation (11) can be estimated according to the method indicated in equation (14) below:

$$\hat{J}(\tau) = \frac{2}{F_S^2}[Av(\hat{R}_0) - Re\{e^{j\phi}Av(\hat{R}_1)\}] \quad (14)$$

where $\hat{J}(\tau)$ is termed the estimation objective function in this invention and Av(x) denotes averaging of the x values obtained from at least one OFDM symbol over the number of such symbols. Let K be the number of OFDM symbols used in the average calculation. Its value can have a variety of choices depending on the situation. For example, if a channel estimation is performed over S OFDM symbols (where S is an integer), then K may be set equal to S so that its range covers those symbols. If K=1, then there is no need to literally carry out the averaging operation indicated by Av(x).

Subsequently, consider how to estimate the mean channel delay. In view that $\hat{J}(\tau)$ is an estimate of $\bar{J}(\tau)$ and that $$\tau_\mu = \arg\min_\tau \bar{J}(\tau)$$

(see equation (6)), the mean channel delay is estimated with $$\arg\min_\tau \hat{J}(\tau),$$

resulting in what is shown in equation (15) below:

$$\hat{\tau}_\mu = \arg\min_\tau \frac{2}{F_S^2}(Av(\hat{R}_0) - Re\{e^{j\phi}Av(\hat{R}_1)\}) = -\frac{N\angle Av(\hat{R}_1)}{2\pi F_s} \quad (15)$$

where $\hat{\tau}_\mu$ denotes the mean delay estimated and ∠x indicates the phase angle of the complex number x on the complex plane.

Similar reasoning can also be applied to the estimation of the RMS delay spread of the channel, in which let $\tau_{rms}$ denote the RMS delay spread estimate. In accordance to equation (8), the MS delay spread can be estimated as shown in equation (16):

$$\hat{\tau}_{rms}^2 = \frac{N^2 \min \hat{J}(\tau)}{4\pi^2 Av(\hat{R}_0)} \quad (16)$$

Therefore, the RMS delay spread can be estimated as shown in equation (17):

$$\hat{\tau}_{rms} = \frac{N}{2\pi F_s}\sqrt{2\left(1 - \frac{|Av(\hat{R}_1)|}{Av(\hat{R}_0)}\right)} \quad (17)$$

The channel delay parameters can be estimated via steps S21 to S24 as described above.

Figure 4:
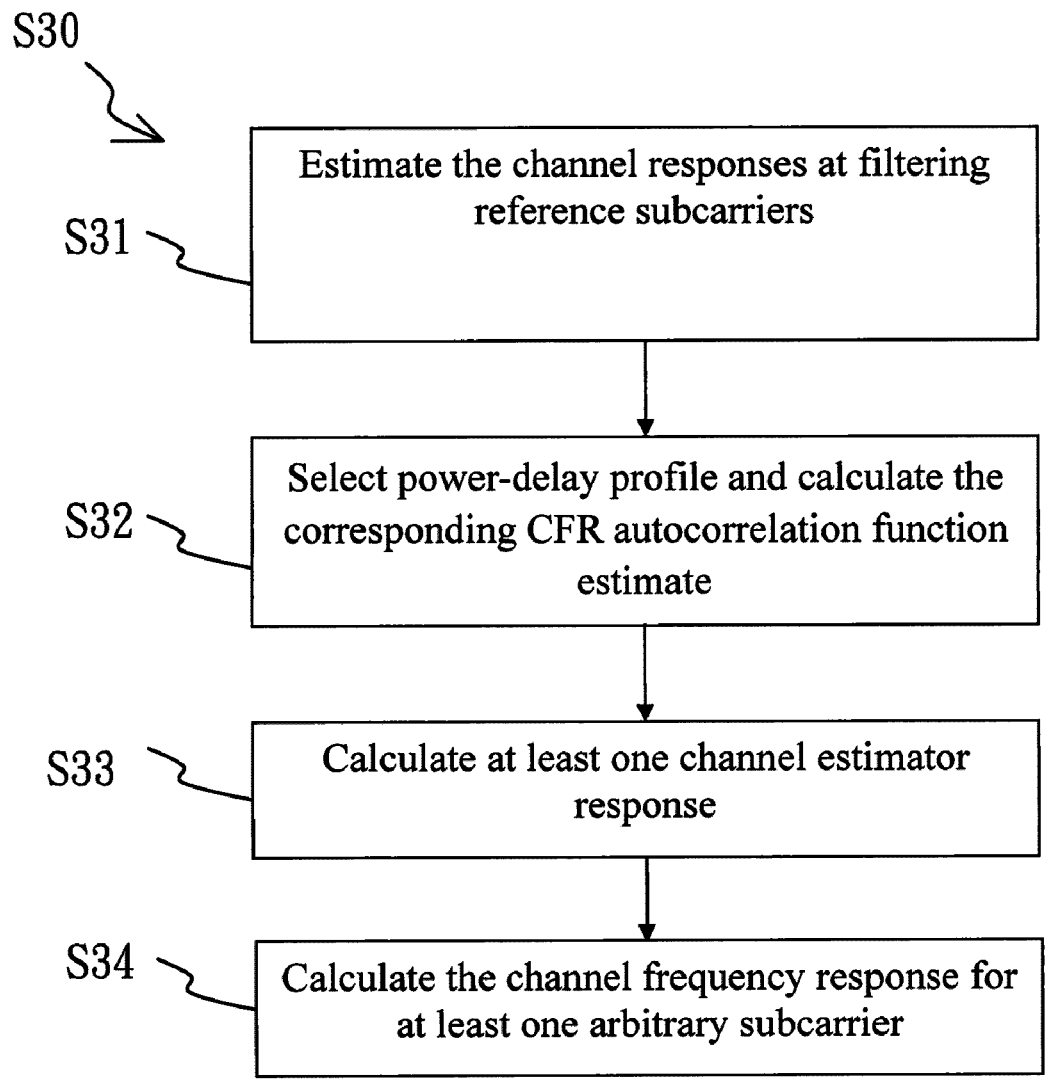
FIG. 4 is a flow chart schematically showing the method of the present invention for channel estimation at arbitrary subcarrier.

Next, refer to FIG. 4 which illustrates how the present invention estimates the channel response of any arbitrary subcarrier in the multi-carrier system.

First, in step S31, take a plurality of subcarriers to be "filtering reference subcarriers" and estimate their channel responses. The purpose of S31 is to eventually facilitate the channel estimation for arbitrary subcarriers in steps S33 and S34. The set of subcarriers taken to be the filtering reference subcarriers can be the same as, partially different with, or completely different from the set of modeling reference subcarriers of step S21. An example for the latter two cases (filtering reference subcarriers being partially or completely different from modeling reference subcarriers) is taking, to be part or all or the filtering reference subcarriers, some subcarriers from OFDM symbol(s) that are different from the OFDM symbol(s) from which the modeling reference subcarriers are taken. The abovementioned filtering reference subcarriers can be pilot subcarriers, but they can also be other suitable subcarriers selected properly based on the communication system under consideration. In particular, if the filtering reference subcarriers consist solely of some pilot subcarriers, then, similar to channel estimation at the modeling reference subcarriers, the LS technique may be employed to obtain enough quantity of pilot subcarrier channel estimates.

Next proceed to step S32 where a channel power delay profile (PDP) is selected and the corresponding autocorrelation function estimate, $\hat{R}_f(k)$, of the CFR is determined, where k is an integer denoting the spacing between two subcarriers. The present invention puts no restriction on the shape of the channel PDP. It can be a uniform PDP, an exponential PDP, or any other PDP that is capable of being defined by the mean delay and the RMS delay spread. Each channel PDP corresponds to a CFR autocorrelation function. Equation (18) below gives a way of computing the CFR autocorrelation function estimate $\hat{R}_f(k)$ when a uniform PDP is adopted, and equation (19) that when an exponential PDP is adopted:

$$\hat{R}_f(k) = \frac{Av(\hat{R}_0)e^{-j2\pi\hat{\tau}_\mu k/N}\sin(\sqrt{12}\,\pi\hat{\tau}_{rms}k/N)}{\sqrt{12}\,\pi\hat{\tau}_{rms}k/N} \quad (18)$$

$$\hat{R}_f(k) = \frac{Av(\hat{R}_0)e^{-j2\pi(\hat{\tau}_\mu-\hat{\tau}_{rms})k/N}}{1 + j2\pi\hat{\tau}_{rms}k/N} \quad (19)$$

In addition, if a uniform PDP is adopted, then the present invention can estimate the initial channel delay as $\hat{\tau}_0 = \hat{\tau}_\mu - \sqrt{3}\hat{\tau}_{rms}$, whereas if an exponential PDP is adopted, as $\hat{\tau}_0 = \hat{\tau}_\mu - \hat{\tau}_{rms}$. Note that although the initial delay derived above can be used to establish a more detailed channel response model, it has no influence on the flow of channel estimation of the present invention.

Now proceed to step S33 where the present invention calculates the channel estimator response required for each subcarrier channel response to be estimated. For this, the present invention takes the linear minimum mean-square error (LMMSE) approach to channel estimation and obtains the equation for channel estimator calculation as follows:

$$\underline{w}_d = (\hat{R}_p\hat{\sigma}_n^2 I)^{-1}\hat{r}_{dp} \quad (20)$$

where d denotes any subcarrier in the multi-carrier system whose channel response is to be estimated; $\underline{w}_d$ denotes the vector of channel estimator coefficients for the subcarrier, whose length, denoted M, is the same as the number of filtering reference subcarriers used to estimate the desired subcarrier channel; $\hat{R}_p$ is an M×M autocorrelation matrix, whose (i, j)th element is the estimated channel autocorrelation between the ith and the jth filtering reference subcarriers that are used to estimate subcarrier d's channel response (the value of this element being obtainable directly from the estimated CFR autocorrelation function $\hat{R}_f(k)$ obtained in step S32 as the spacing between the above ith and jth filtering reference subcarriers for subcarrier d is known); $\hat{\sigma}_n^2$ is the variance of additive interference and noise that is estimated in step S22; I denotes an identity matrix; $\hat{r}_{dp}$ is the vector of cross-correlation estimates between the channel responses at the filtering reference subcarriers used to estimate subcarrier d's channel response and that at subcarrier d, wherein the ith element is the estimated correlation between the channel response at the ith filtering reference subcarrier that is used to estimate subcarrier d's channel response and that at subcarrier d (the value of this element being obtainable directly from the estimated CFR autocorrelation function $\hat{R}_f(k)$ obtained in step S32 as the spacing between subcarrier d and the above ith filtering reference subcarrier is known).

In addition, in the above process, one may, in advance, quantize the intervals of values for the mean delay estimate $\hat{\tau}_\mu$ and the RMS delay spread estimate $\hat{\tau}_{rms}$ to a finite number of choices and store these finite choices, together with the values of the corresponding autocorrelation estimates $\hat{R}_f(k)$, in a table form. This way, the computations required in step S32 can be replaced by table lookup, resulting in reduced computational complexity for the system. Furthermore, the estimated variance of interference and noise, $\hat{\sigma}_n^2$, can also be quantized to a finite number of choices. Then a lookup table can be constructed for the combinations of the quantized mean delay estimate $\hat{\tau}_\mu$, the quantized RMS delay spread estimate $\hat{\tau}_{rms}$, and the quantized interference and noise variance $\hat{\sigma}_n^2$ together with the corresponding coefficient vectors $\underline{w}_d$ of the channel estimator. Then the two steps S32 and S33 can be replaced by one table lookup, further simplifying the computation. A particular point to note is that the use of LMMSE technique to design arbitrary subcarrier channel estimators and the resort to table lookup to simplify computation in the present invention only represent some preferred ways of embodiment and should not be taken to limit the scope of the present invention. People with reasonable skill in the art can employ different ways of filtering for channel estimation or use different table lookup methods to calculate channel estimator responses based on the spirit of the present invention. Therefore, any equivalent modification or variation according to the structures, characteristics and spirits disclosed in the present invention is to be also included within the scope of the present invention.

Finally in step S34, the present invention calculates the channel frequency response of arbitrary subcarrier d according to the following mathematical equation:

$$H_d = \underline{w}_d^H \hat{H}_p \quad (21)$$

where $\hat{H}_d$ denotes the estimated channel response for arbitrary subcarrier d; $\hat{H}_p$ is the vector of estimated channel responses at the filtering reference subcarriers used to calculate $\hat{H}_d$, whose elements are estimated in step S31 and whose ith element is the estimated channel response for the ith filtering reference subcarrier used in estimation of arbitrary subcarrier d's channel response; and the superscript H to the channel estimator response vector $\underline{w}_d$ denotes Hermitian transpose.

In conclusion, the present invention provides a channel estimation technique for OFDM systems which can work under the situation where there does not exist a large amount of pilot signal and the situation where the pilot subcarriers have irregular or pseudo-random configurations. Moreover, the estimation technique of the present invention has low computational complexity, yet it can estimate the channel delay parameters (including the initial delay, mean delay, and RMS delay spread) accurately for the purpose of channel response estimation. Further, the method of the present invention has wide applicability in that the PDP model adopted in the channel estimation process can be exponential, uniform, or any other shape that can be described in terms of the mean delay and the RMS delay spread. As a result, many standard communication systems such as IEEE 802.11a, IEEE 802.11g, IEEE 802.16/WiMAX, 4G; DAB and DVB can all adopt the channel estimation technique for multi-carrier systems of the present invention to reduce the computational complexity or enhance the estimation performance.

The following will illustrate how the channel estimation technique of the present invention can be applied in situations with pseudo-random pilot signal distribution. The illustration is exemplified using the Mobile WiMAX system. In Mobile WiMAX, the downlink (DL) signals adopt a "cluster" structure while the uplink (UL) signals adopt a "tile" structure. Because of the "piece-by-piece" kind of signal structure, the present invention performs estimation over the frequency span of a "piece" (cluster or tile) as a unit.

Figure 5:
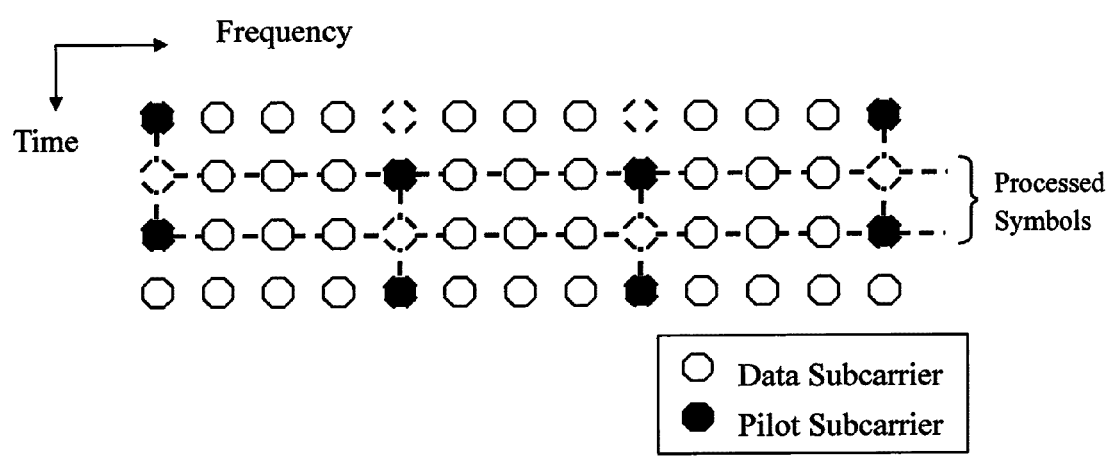
FIG. 5 is a diagram schematically showing a basic downlink signal structure of Mobile WiMAX for one of the preferred embodiments of the present invention.

In a DL subframe of the Mobile WiMAX signal, the useful subcarriers in an OFDM symbol that contains data subcarriers are divided into a plurality of "clusters." FIG. 5 illustrates the signal structure of clusters by depicting four clusters that occupy the same frequency location in four temporally consecutive OFDM symbols. Each row in the figure exemplifies a cluster. Every cluster is comprised of 14 consecutive subcarriers in frequency domain. The figure uses white circles to indicate data subcarriers and black circles to indicate pilot subcarriers. The DL transmission to every user consists of a plurality of subcarriers from a plurality of clusters that are continuous in time and located at the same pseudo-random frequency positions. The DL transmission contains both pilot subcarriers and data subcarriers, where the pilot subcarriers consist of all the pilot subcarriers in the plurality of clusters. But the data subcarriers therein have more flexibility—they do not have to use up all the data subcarriers in the plurality of clusters, but can be determined according to user demand and system planning. In the DL signal transmitted to each user, therefore, because of the pseudo-random distribution of the clusters in the frequency domain, the pilot subcarriers, as a whole, are also pseudo-randomly distributed in the frequency domain. In addition, FIG. 5 also shows that the positioning of pilot subcarriers in a cluster is different according to whether the time index of the OFDM symbol is even or odd.

For illustration, suppose, in the user equipment, the second and the third symbols in time sequence as depicted in FIG. 5 are being considered for channel estimation (which are denoted "processed symbols" in the figure). The procedure of estimation follows steps S20 and S30 described previously. To start, let the set of modeling reference subcarriers of step S21 be the same as the set of filtering reference subcarriers of step S31, where these reference subcarriers include all the pilot subcarriers in the DL signal to this user and some other subcarriers (as described below) in the processed symbols. The vertical dashed lines in FIG. 5 help to illustrate how step S21 is accomplished (which at the same time accomplishes step S31). First, consider those pilot subcarriers in the DL signal for the user in the four OFDM symbols illustrated in FIG. 5 where the associated channel responses have not been estimated. Estimate these channel responses, for example, by the aforementioned LS technique, that is, by dividing the received signal value at each pilot subcarrier by the value of the pilot signal there or multiplying the reciprocal of the pilot signal value. Next, perform time-domain interpolation with the pilot subcarrier channel response estimates of the first and the third symbols. At the same time, also perform time-domain interpolation with the pilot subcarrier channel response estimates of the second and the fourth symbols. This way, two additional subcarrier channel response estimates are effected in each of the corresponding clusters in the second and the third symbols (illustrated in FIG. 5 by the four data subcarriers run cross by the vertical dashed lines). In total, four subcarrier channel estimates are obtained in each of the corresponding clusters in the second and the third symbols, of which two are pilot subcarrier channel estimates and the other two are subcarrier channel estimates obtained through temporal interpolation. The collection of these four subcarriers per cluster constitutes the modeling as well as the filtering reference subcarriers. Next, the calculation of $\hat{\sigma}_n^2$ in step S22 can make use of the null subcarriers in the two processed symbols, or the null subcarriers in other symbol(s) such as that in the preamble symbol of the DL subframe in which the two processed symbols are located. Since the purpose of steps S23 to S24 and S32 to S33 is to calculate the responses of subcarrier channel estimators, the totality of the estimated channel responses of reference subcarriers, four per cluster from all the used clusters in the two processed symbols, can be used for the values of $\hat{H}(f)$ as needed in these steps as described previously. For convenience, the above-described technique for Mobile WiMAX DL channel estimation will be referred to as method 1. Furthermore, an alternative is to perform the estimation of channel delay parameters in steps S21-S24 with OFDM symbols other than the two processed symbols (such as using the pilot subcarriers in the preamble symbol of the DL subframe in which the two processed symbols are located as modeling reference subcarriers), but use the same way as in method 1 to conduct steps S31-S34. We will refer to this alternative as method 2 in the following.

The embodiment described above for Mobile WiMAX DL signals is for purpose of illustration so that the application of the present invention can be more readily understood. Therefore, based on the spirit of the present invention, people with reasonable skill in the art could vary the ways of channel estimation according to the characteristics of the OFDM signals based on the steps revealed in FIGS. 3 and 4. So any equivalent modification or variation according to the structures, characteristics and spirits disclosed in the present invention is to be also included within the scope of the present invention.

Figure 6:
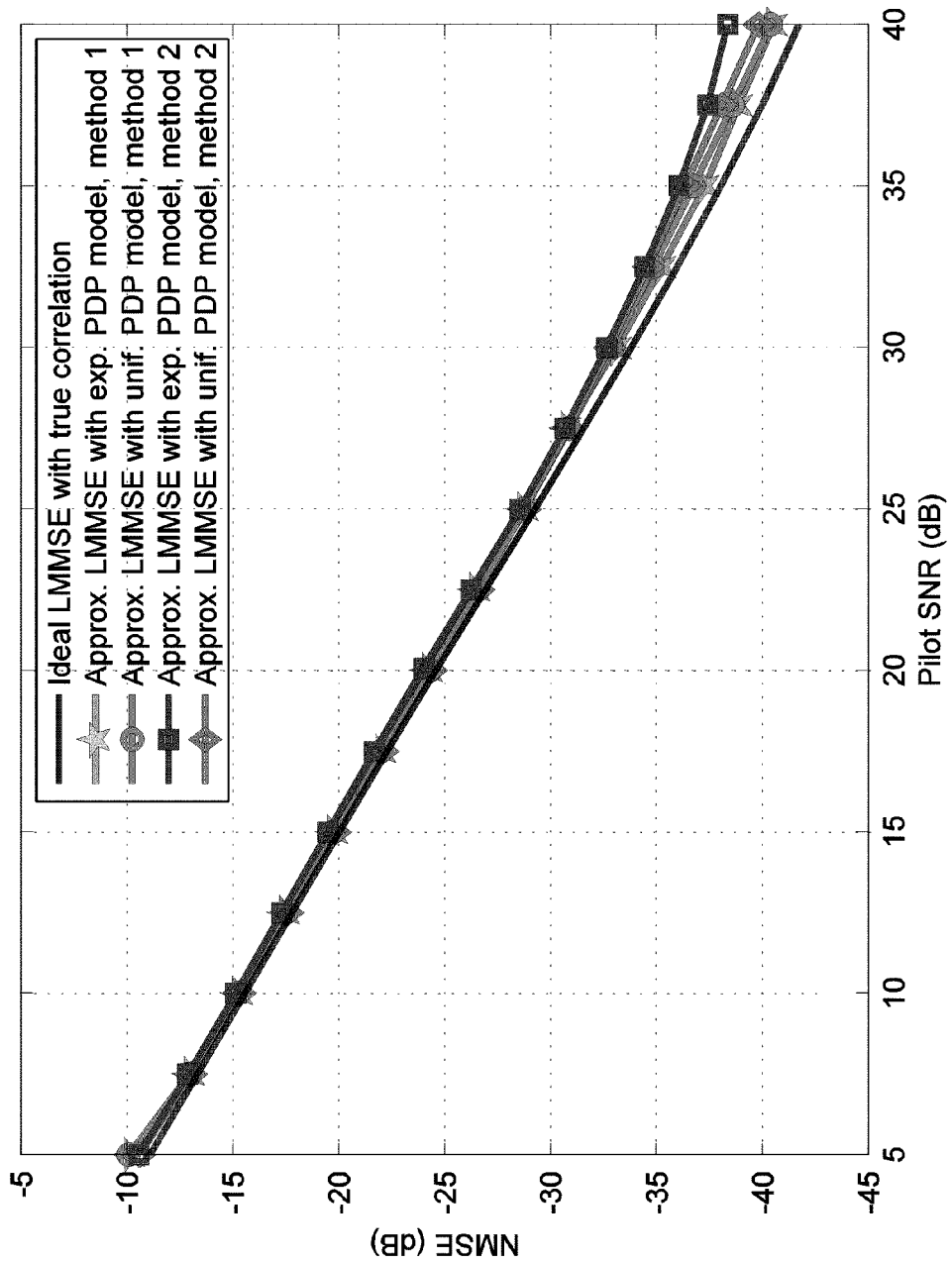
FIG. 6 is a diagram schematically showing the performance of data subcarrier channel estimation of the present invention in Mobile WiMAX downlink transmission under a channel close to the Vehicular A model in power-delay profile and with the user equipment moving at a speed of 100 km/h.

FIG. 6 is a diagram showing some performance results of data subcarrier channel estimation obtained using the above-described methods for Mobile WiMAX DL transmission under a channel model close to International Telecommunication Union (ITU)'s Vehicular A reference PDP model. (A description of the Vehicular A PDP model can be found in T. B. Sorensen, P. E. Mogensen, and F. Frederiksen, "Extension of the ITU channel models for wideband (OFDM) systems," in *IEEE Vehicular Technology Conference*, pp. 392-396, September 2005.) The PDP shapes employed in the computation of step S32 are uniform (labeled "unif. PDP" in the figure) and exponential (labeled "exp. PDP" in the figure). The user end is assumed to be moving at a speed of 100 km/h. Other system parameters are as follows: DFT size N=1024, bandwidth=10 MHz, carrier frequency=2.5 GHz, each DL subframe contains 24 OFDM symbols after the preamble, and 12 clusters (i.e., 6 subchannels) are transmitted in each symbol. The delay profile of the channel is given by "10, 13, 17, 21, 27, 35" (in units of sampling interval) and the power profile by "0, −1, −9, −10, −15, −20" (in units of dB). In FIG. 6, results obtained with method 1 described above are labeled "method 1" in the legend, results obtained with method 2 described above are labeled "method 2" in the legend, and results labeled "ideal" in the legend are obtained with LMMSE channel estimation employing noise-free autocorrelation function of the CFR. The last set of results represents an unachievable ideal condition, provided for comparison purpose only.

Figure 7:
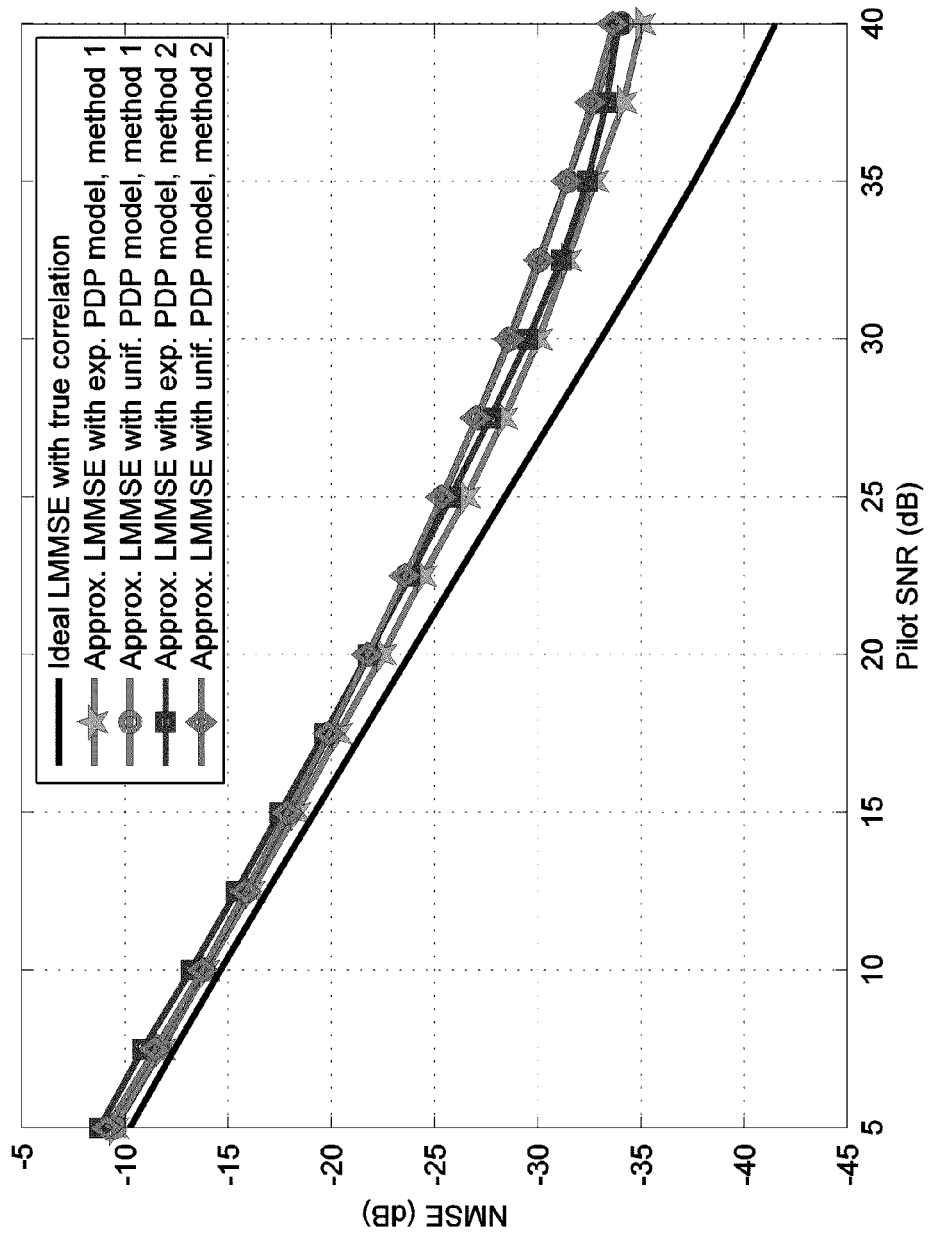
FIG. 7 is a diagram schematically showing the performance of data subcarrier channel estimation of the present invention in Mobile WiMAX downlink transmission under a channel close to the SUI-5 model in power-delay profile and with the user equipment moving at a speed of 100 km/h.

FIG. 7 shows the data subcarrier channel estimation performance of the present invention at different conditions under a channel model close to SUI-5 PDP, where the delay profile of the channel is given by "0, 45, 112" (in units sampling interval) and the power profile by "0, −5, −10" (in units of dB). (A description of the SUI-5 PDP model can be found in V. Erceg et al., "Channel models for fixed wireless applications," IEEE 802.16 standards contribution no. IEEE 802.16.3c-01/29r4, Jul. 17, 2001.) The moving speed of the user end and other system parameters are the same as for FIG. 6.

Figure 8:
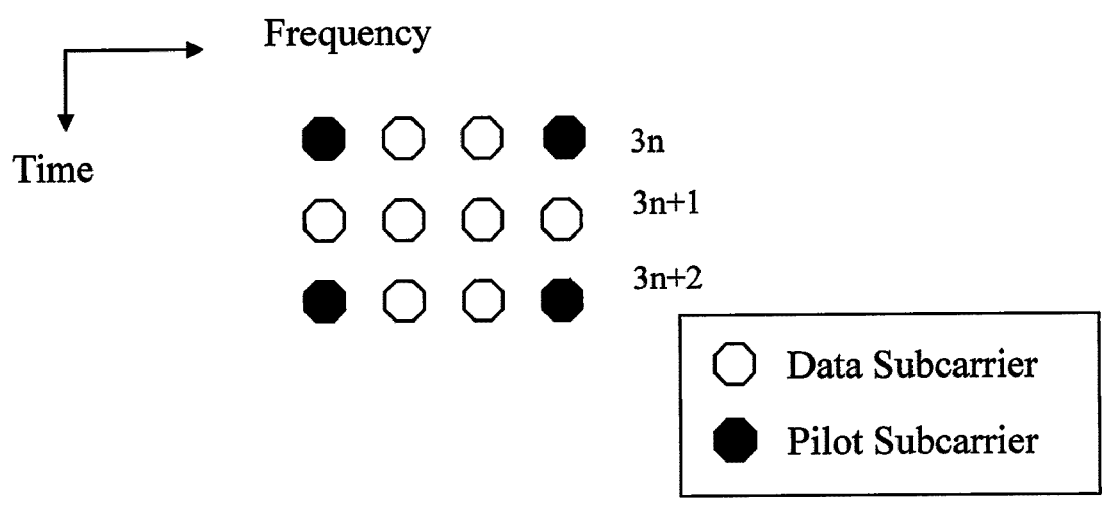
FIG. 8 is a diagram schematically showing a basic uplink signal structure of Mobile WiMAX for another preferred embodiment of the present invention.

Refer to FIG. 8 for a diagram schematically showing the basic structure of Mobile WiMAX UL signals. In Mobile WiMAX uplink, the useful subcarriers are divided into "tiles" where each tile comprises four consecutive in the frequency domain. A subchannel comprises six tiles that are pseudo-randomly distributed in the frequency domain. The basic unit of allocation for UL data transmission consists of three sets of such six tiles (i.e., one subchannel) that are taken from three consecutive OFDM symbols, one set each. The three OFDM symbols should have indexes $3n$, $3n+1$, and $3n+2$ for some integer n, and the three sets of tiles are all located at the same six pseudo-random frequency positions. FIG. 8 illustrates how pilot subcarriers and data subcarriers are arranged in the tiles of such a basic transmission unit. The channel estimation process still follows the computational procedure of steps S20 and S30. A particular point to note here is that the calculation of interference and noise variance of step S22 only needs to be performed once for all users, but not for each individual user separately. In addition, for steps S23-S24, since pilot subcarriers only exist in the first and the third symbols for every group of three consecutive OFDM symbols, but not in the second one, the system can simply use the pilot subcarriers in the tiles of the first and the third symbols of every user's signal to estimate the channel delay parameters (including the mean delay and the RMS delay spread). Furthermore, in step S30, after selecting the PDP, second-order LMMSE channel estimators are calculated and applied to the tiles in the first and the third symbols to estimate the data subcarrier channel responses therein. Then, with what amounts to a minor modification, a simple time-domain interpolation can be applied to the subcarrier channel response estimates obtained for the first and the third symbols to obtain the data subcarrier channel estimates for all the tiles of the second symbol.

The embodiments described above are only to exemplify the present invention but not to limit the scope of the present invention. Therefore, any equivalent modification or variation according to the structures, characteristics and spirits disclosed in the present invention is to be also included within the scope of the present invention.

What is claimed is:

1. A channel estimation method for multi-carrier systems that provides estimation of the channel response between a transmitter and a receiver, said receiver receives signal transmitted by said transmitter where said signal comprises a plurality of subcarriers that are divided into a plurality of useful subcarriers and a plurality of null subcarriers, wherein said useful subcarriers comprises multiple pilot subcarriers and multiple data subcarriers; said channel estimation method comprises following steps:
  a. taking a set of said subcarriers to be modeling reference subcarriers and estimating their corresponding channel responses;
  b. taking a set of said null subcarriers to estimate a variance of interference and noise;
  c. using said channel response estimates for said modeling reference subcarriers and said interference and noise variance to calculate two autocorrelation values, one with zero lag and the other with a nonzero lag;
  d. using said two autocorrelation values to calculate delay parameter estimates of said channel which include at least one mean delay estimate and one root-mean-square (RMS) delay spread estimate;
  e. selecting one power-delay profile, and using said mean delay estimate and said RMS delay spread estimate to establish an autocorrelation function estimate of channel frequency response corresponding to said power-delay profile; and
  f. taking a set of said subcarriers to be filtering reference subcarriers and estimating their corresponding channel responses; and using said autocorrelation function estimate of channel frequency response to calculate at least one channel estimator response for interpolation, and using it to interpolate said channel response estimates of said filtering reference subcarriers to obtain channel response estimate for at least one said subcarrier.

2. The channel estimation method for multi-carrier systems according to claim 1, wherein in step a or step f, said modeling reference subcarriers or said filtering reference subcarriers comprise a plurality of said pilot subcarriers, or at least one said pilot subcarrier and at least one said data subcarrier, or at least one said pilot subcarrier and at least one said null subcarrier, and said filtering reference subcarriers and said modeling reference subcarriers are either completely the same, partially the same or completely different.

3. The channel estimation method for multi-carrier systems according to claim 1, wherein step a or step f uses the least-square method to estimate the channel response of at least one pilot subcarrier in the said modeling reference subcarriers or said filtering reference subcarriers.

4. The channel estimation method for multi-carrier systems according to claim 1, wherein in step a or step f, said modeling reference subcarriers or said filtering reference subcarriers comprise at least one said pilot subcarrier and at least one said data subcarrier, or at least one said pilot subcarrier and at least one said null subcarrier, with the channel response estimate of each said data subcarrier or null subcarrier obtained by interpolating channel response estimate or estimates of said pilot subcarrier or subcarriers.

5. The channel estimation method for multi-carrier systems according to claim 1, wherein step b estimates said variance of interference and noise using an average received power of said null subcarriers in the guard band or at other frequencies.

6. The channel estimation method for multi-carrier systems according to claim 1, wherein in step c, said autocorrelation value with zero lag, $\hat{R}_0$, is calculated according to the following equation:

$$\hat{R}_0 = \langle\langle |\hat{H}(f)|^2 \rangle\rangle - \hat{\sigma}_n^2$$

where f denotes any said modeling reference subcarrier, $\hat{H}(f)$ denotes a channel response estimate at said frequency f, $\ll$ $\gg$ denotes averaging over said modeling reference subcarriers, and $\hat{\sigma}_n^2$ denotes said variance of interference and noise.

7. The channel estimation method for multi-carrier systems according to claim 1, wherein in step c, said autocorrelation value with a nonzero lag, $\hat{R}_1$, is calculated according to the following equation:

$$\hat{R}_1 = \langle\langle \hat{H}(f+F_s)\hat{H}^*(f) \rangle\rangle;$$

where f and $f+F_S$ denote any two said modeling reference subcarriers, $F_S$ is a nonzero number giving the frequency spacing between said two modeling reference subcarriers, $\hat{H}(f)$ and $\hat{H}(f+F_S)$ denote channel response estimates for said two modeling reference subcarriers, superscript * denotes complex conjugation, and $\ll \gg$ denotes averaging over said modeling reference subcarriers.

8. The channel estimation method for multi-carrier systems according to claim 1, wherein in step d, said mean delay estimate is taken to be a value $\tau$ that minimizes a function $J(\tau)$ or minimizes an approximation of said function $J(\tau)$, where $$\overline{J}(\tau) = E\left\{\left|\frac{d[e^{j2\pi\tau f/N}H(f)]}{df}\right|^2\right\} = \frac{4\pi^2}{N^2}\sum_{l=0}^{L-1}E(|\alpha_l|^2)(l-\tau)^2$$

and said RMS delay spread estimate is taken to be said minimum value of said function or said approximation multiplied with $N/(2\pi\sqrt{R_0})$, with E denoting taking expected value, f denoting frequency, d/df denoting differentiation with respect to frequency, ⟨ ⟩ denoting averaging over frequency, H(f) denoting channel frequency response, N denoting size of discrete Fourier transform used in said multi-carrier system, L being an integer in units of the sampling interval $T_S$ and denoting length of channel impulse response, $\alpha_l$ denoting complex Gaussian channel gain of channel path with delay $lT_S$, and $R_0$ is equal to $$\sum_{l=0}^{L-1}E(|\alpha_l|^2)$$

(power gain of said channel) or an approximation thereof.

9. The channel estimation method for multi-carrier systems according to claim 8, wherein said approximation to said function $\overline{J}(\tau)$ is set equal to the following function $\hat{J}(\tau)$:

$$\hat{J}(\tau) = \frac{2}{F_s^2}[Av(\hat{R}_0) - Re\{e^{j2\pi\tau F_s/N}Av(\hat{R}_1)\}]$$

where Av(x) denotes taking average of the value or values of x calculated from at least one orthogonal frequency division multiplexing (OFDM) symbol over the number of such symbols, $\hat{R}_0$ and $\hat{R}_1$ denote said two autocorrelation values, $F_S$ denotes frequency spacing between any two said modeling reference subcarriers, and N denotes size of discrete Fourier transform used in said multi-carrier system.

10. The channel estimation method for multi-carrier systems according to claim 9, wherein in step d, an equation for said mean delay estimate is as follows:

$$\hat{\tau}_\mu = -\frac{NL Av(\hat{R}_1)}{2\pi F_s}$$

where $\hat{\tau}_\mu$ is said mean delay estimate, and ∠x indicates the phase angle of a complex number x in the complex plane.

11. The channel estimation method for multi-carrier systems according to claim 9, wherein an equation for said RMS delay spread estimate is as follows:

$$\hat{\tau}_{rms} = \frac{N}{2\pi F_s}\sqrt{2\left(1 - \frac{|Av(\hat{R}_1)|}{Av(\hat{R}_0)}\right)}$$

where $\hat{\tau}_{rms}$ is said RMS delay spread estimate.

12. The channel estimation method for multi-carrier systems according to claim 1, wherein said power-delay profile in step e is a uniform power-delay profile or an exponential power-delay profile.

13. The channel estimation method for multi-carrier systems according to claim 12, wherein said autocorrelation function estimate of channel frequency response corresponding to said uniform power-delay profile is as follows:

$$\hat{R}_f(k) = \frac{Av(\hat{R}_0)e^{-j2\pi\hat{\tau}_\mu k/N}\sin(\sqrt{12}\,\pi\hat{\tau}_{rms}k/N)}{\sqrt{12}\,\pi\hat{\tau}_{rms}k/N}$$

and said autocorrelation function estimate of channel frequency response corresponding to said exponential power-delay profile is as follows:

$$\hat{R}_f(k) = \frac{Av(\hat{R}_0)e^{-j2\pi(\hat{\tau}_\mu - \hat{\tau}_{rms})k/N}}{1 + j2\pi\hat{\tau}_{rms}k/N};$$

where $\hat{R}_f(k)$ denotes autocorrelation function estimate of any two said subcarrier frequencies that are spaced k subcarriers apart in said multi-carrier system, Av(x) denotes taking average of the value or values of x calculated from at least one orthogonal frequency division multiplexing (OFDM) symbol over the number of such symbols, $\hat{R}_0$ denotes said autocorrelation value with zero lag, N denotes size of discrete Fourier transform used in said multi-carrier system, $\hat{\tau}_\mu$ is said mean delay estimate, and $\hat{\tau}_{rms}$ is said RMS delay spread estimate.

14. The channel estimation method for multi-carrier systems according to claim 1, wherein step f uses a linear minimum mean-square error method to obtain a channel estimator coefficient vector $\underline{w}_d$, for which a mathematical equation is as follows:

$$\underline{w}_d = (\hat{R}_p + \hat{\sigma}_n^2 I)^{-1}\hat{r}_{dp}$$

where d denotes any subcarrier in said multi-carrier system where channel response is to be estimated; $\underline{w}_d$ denotes said channel estimator coefficient vector for said subcarrier d where channel response is to be estimated, whose length is the same as a number of filtering reference subcarrier channel estimates selected to estimate channel response at said subcarrier d and is denoted by M below; $\hat{R}_p$ denotes an M×M autocorrelation matrix of channel responses of said selected filtering reference subcarriers used to estimate said channel response at said subcarrier d; $\hat{\sigma}_n^2$ denotes said estimated variance of interference and noise; I denotes an identity matrix; and $\hat{r}_{dp}$ denotes a cross-correlation vector between channel responses of said selected filtering reference subcarriers used to estimate said channel response at said subcarrier d and channel response of said subcarrier d.

15. The channel estimation method for multi-carrier systems according to claim 14, wherein step f uses the following mathematical model to estimate channel response of any said subcarrier d where channel response is to be estimated:

$$\hat{H}_d = \underline{w}_d^H \underline{\hat{H}}_p$$

where $\hat{H}_d$ denotes the estimated channel response of said subcarrier d, superscript H of $\underline{w}_d$ denotes Hermitian transpose, and $\underline{\hat{H}}_p$ denotes a vector of the same length as $\underline{w}_d$ of channel response estimates at said selected filtering reference subcarriers used to estimate said subcarrier d's channel response.

16. The channel estimation method for multi-carrier systems according to claim 1, wherein at least a part of said pilot subcarriers appear periodically within said subcarriers.

17. The channel estimation method for multi-carrier systems according to claim 1, wherein said pilot subcarriers appear pseudo-randomly or irregularly within said data subcarriers.

18. The channel estimation method for multi-carrier systems according to claim 17, wherein in a WiMAX downlink system, said signal from said transmitter contains multiple temporally continuous OFDM symbols, with each said symbol comprising multiple clusters and each said cluster comprising multiple pilot subcarriers and multiple data subcarriers, where in a said symbol with even time index, said pilot subcarriers are lined up in frequency domain with pilot subcarriers in other said symbols with even time indexes and, in a said symbol with odd time index, said pilot subcarriers are lined up in frequency domain with pilot subcarriers in other said symbols with odd time indexes, but said pilot subcarriers in said even-indexed symbols and said pilot subcarriers in said odd-indexed symbols occupy different frequency positions; in step a or step f, said modeling reference subcarriers or said filtering reference subcarriers are comprised of a plurality of said subcarriers, some located at frequency positions of said pilot subcarriers in said even-indexed symbols and some at frequency positions of said pilot subcarriers in odd-indexed symbols.

19. The channel estimation method for multi-carrier systems according to claim 18, wherein the channel estimation for a said modeling reference subcarrier or a said filtering reference subcarrier that is located at a said data subcarrier or at a said null subcarrier is accomplished by time-domain interpolation between a preceding and a following channel estimates for said pilot subcarriers that are located at the same frequency position of said modeling or filtering reference subcarrier in other OFDM symbols.

20. The channel estimation method for multi-carrier systems according to claim 17, wherein in a WiMAX uplink system, an OFDM symbol is composed of multiple tiles and an uplink signal of any user comprises multiple tiles from multiple OFDM symbols; in channel estimation, the channel response of a said subcarrier in a tile that does not contain said pilot subcarriers is estimated by time-domain interpolation of channel response estimates for said subcarriers at the same frequency position in the immediately preceding and the immediately succeeding two said symbols.

* * * * *